UNITED STATES PATENT OFFICE.

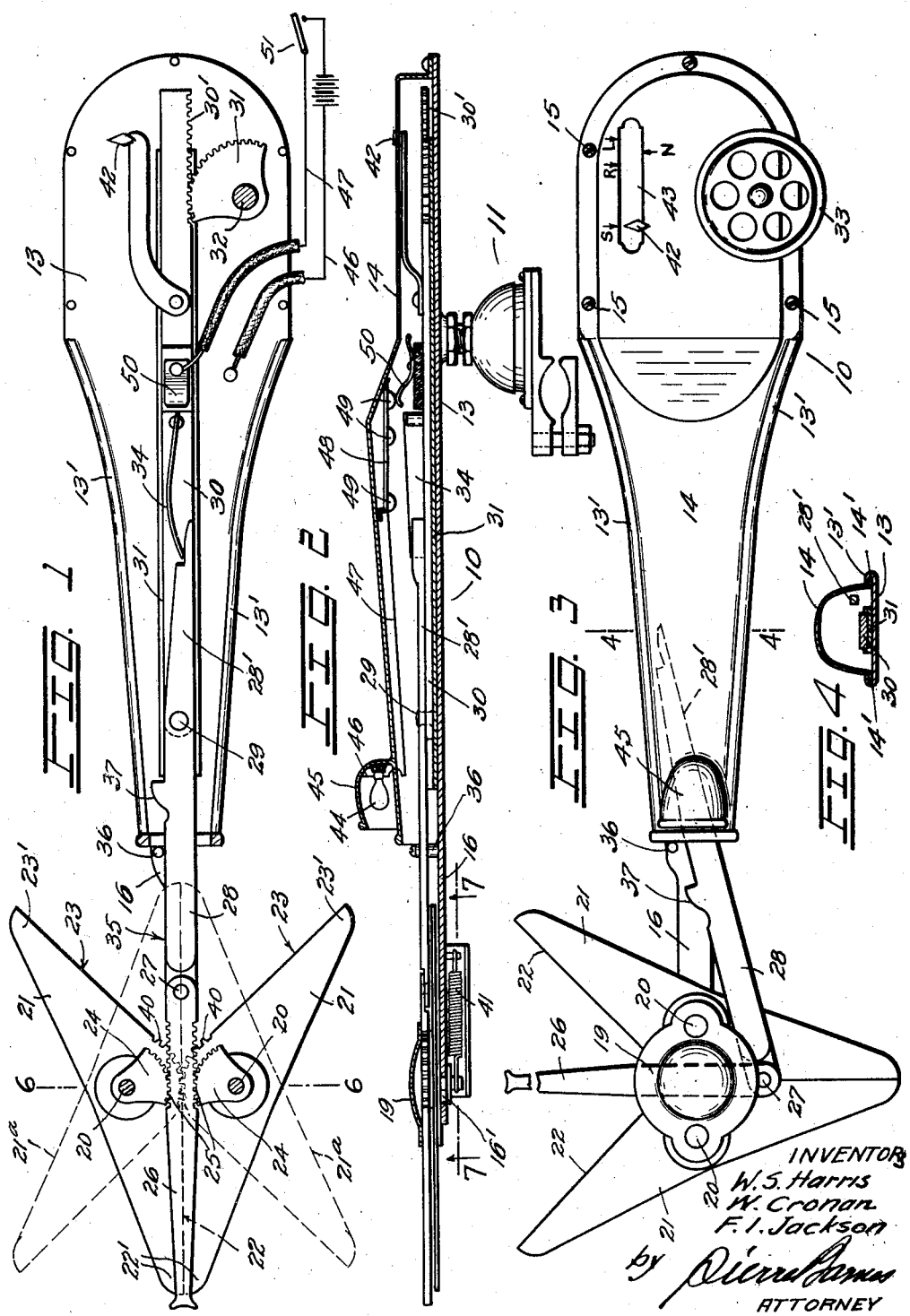

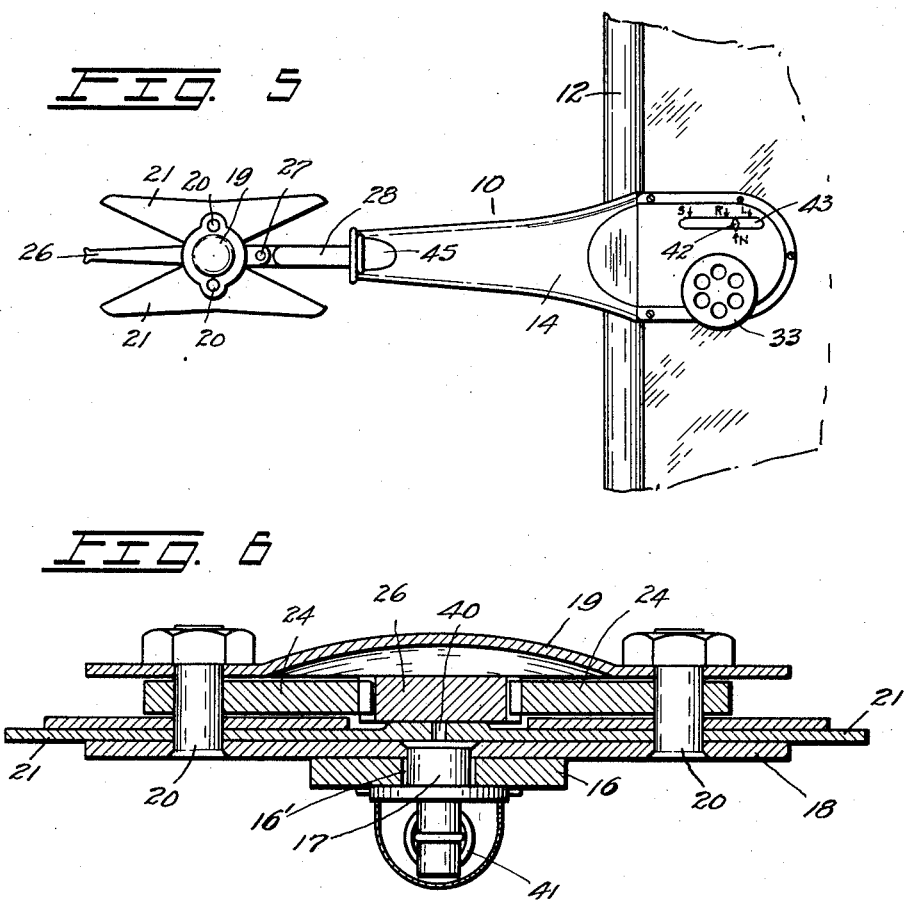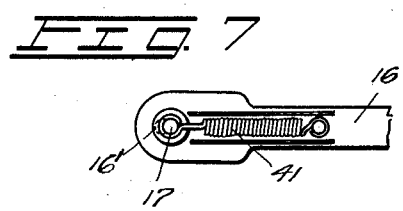

WILLIAM S. HARRIS, WILLIAM CRONAN, AND FRANK I. JACKSON, OF BREMERTON, WASHINGTON.

AUTOMOBILE DIRECTION-SIGNAL.

1,391,954.      Specification of Letters Patent.     Patented Sept. 27, 1921.

Application filed March 15, 1921. Serial No. 452,579.

*To all whom it may concern:*

Be it known that we, WILLIAM S. HARRIS, WILLIAM CRONAN, and FRANK I. JACKSON, citizens of the United States, residing at Bremerton, in the county of Kitsap and State of Washington, have invented certain new and useful Improvements in Automobile Direction-Signals, of which the following is a specification.

This invention relates to direction-signals for automobiles; the object of our invention is the provision of a device of this character by means of which the driver of a car may readily inform pedestrians or drivers of other vehicles his intention to stop or turn to one side or the other.

The invention is illustrated in the accompanying drawings, in which—

Figure 1 is a view in rear elevation shown partly in section of a direction signal embodying our invention, a portion of the casing being removed. Fig. 2 is an underside plan view of the same, parts being omitted and the casing shown in horizontal section. Fig. 3 is a rear elevation of the device, the arrow head being shown in a different indicative position from which it is illustrated in Fig. 1. Fig. 4 is a detail sectional view through 4—4 of Fig. 3. Fig. 5 is a rear elevational view of the device shown applied. Fig. 6 is a sectional view through 6—6 of Fig. 1. Fig. 7 is a sectional view through 7—7 of Fig. 2.

In said drawings, the reference numeral 10 represents a casing having adjacent to its inner end an attachment, designated generally by 11 (Fig. 2) by which it may be secured in a horizontal position to the frame 12 of an automobile windshield as represented in Fig. 5.

Said casing, as illustrated, consists of two members 13 and 14 whereof the member 13 is substantially plane and constitutes the front wall of the casing. The other casing member 14 of substantially the form in which it is shown in the drawings is separably connected to the member 13 by having marginal flanges $14^1$ which at one end of the member engage within grooves provided therefor in the other member 13 as by turning the edges $13^1$ of the same as shown in Figs. 1 and 4. The other or inner end of the removable member 14 is secured to the corresponding part of the member 13 by screws 15.

The casing member 13 extends as an arm 16 for a distance beyond the outer end of the member 14 and is provided adjacent to its outer end with a longitudinal slot $16^1$.

A horizontally disposed pin 17, Fig. 6, extending through said slot serves to pivotally connect a substantially circular plate 18 to the casing arm 16. The plate 18 is rigidly secured in spaced relation to a companion plate 19 by means of bolts 20 as shown in Fig. 6. Said plates and bolts constitute a frame which, it will be noted, is connected by the pin 17 to said arm for rotary movements.

The bolts 20 are rigidly secured to and serve as pivotal supports for a pair of similar isosceles triangular blades 21 which are arranged as shown in Fig. 1.

Said blades are operatively connected with each other by means of interengaging gear teeth 40 so that when the opposing equicrural sides as 22 or 23, of the respective blades are brought together the angles $22^1$ and $23^1$ will coöperatively produce the points of an arrow like head.

Rigidly secured to the respective bolts 20 are sector tooth-gears 24 in mesh with rack teeth 25 provided in the opposite edges of a tail rod 26. This rod 26 is pivotally connected at 27 with the arm 28 of a lever which extends into the casing.

Said lever is fulcrumed at 29 to a bar 30 slidable longitudinally in a guide way 31 secured to the front wall of the casing. The bar 30 is formed with back teeth $30^1$ engaging teeth of a sector gear 31 secured to the spindle 32 upon which is an operating wheel 33 exteriorly of the casing.

34 represents a plate-spring connection to the bar 30 and acts against the lever arm $28^1$ to yieldingly retain said lever in a horizontal position by causing straight edge 35 of the other arm 28 of the lever to bear against a roller 36 mounted upon a stud which is secured to the casing arm 16.

The roller 36 also serves when engaged by a cam projection 37 of lever arm 28 to tilt the latter downwardly in opposition to the spring 34.

The operation of the invention so far described is as follows:

By rotating the wheel 33 in one direction or the other the sector gear 31 imparts endwise movement to the bar 30 toward the right or left as may be requisite to cause the arrow head to assume a position indicative of the driver's intention to turn the vehicle to the right or left, or into a stop signal position.

Assuming the blades 21 occupy their normal positions in which they are represented in Fig. 5, by rotating the wheel 33 clockwise the sector gear 31 acts through the medium of the bar 30 and lever arm 28 to move the tail rod 26 toward the right whereby the rack teeth of the latter acting through the medium of sector gears 28 and pivot pins 20 cause the plates 21 to be brought into the position in which they are represented by full lines in Fig. 1. Being thus disposed the plates 21 coöperate to afford an arrow head pointing toward the left hand. To convert the plates into a right-hand pointing arrow head, as indicated by dotted lines 21ª in Fig. 1, the operator turns the wheel 33 contra-clockwise to accordingly move the plates 21 through the instrumentality of the bar 30, lever arm 28 and tail rod 22 which are shifted toward the left. With the arrow head thus arranged, or pointing toward the right, to cause the arrow head to be directed downwardly as in Fig. 3, the bar 30 and associated parts above referred to are still further moved toward the left thereby having the cam projection 37 engage the roller 36 to push the lever arm 28 downwardly. As this occurs the pivot 27 is moved out of "dead center" and the continued left hand travel of the bar and lever acting through the tail rod 26, as a crank, rotates the blade carrying frame about the axis of the pin 17.

An extensible spring 41 is advantageously employed to obvaite rattle between the movable and stationary parts of the device in proximity of the arrow head. 42 represents a pointer carried by the bar 30 and extending through a slot 43 of the casing member 14 for indicating with referenc to a scale of marks denoted by "S," "R," "N" and "L" the relative positions of the arrow head parts with respect to each other and to the casing.

Provided in the invention are means for illuminating the signal for night driving, such illuminating means comprising an electric lamp 44 provided within a reflector 45 which is secured to or formed integral with the casing member 14. Said lamp is in an electric circuit, one lead 46 of which may be grounded through the casing, the other lead 47 includes a terminal 48 having a series of contacts 49 which are arranged to be engaged by a complementary terminal 50 which is carried by the bar 30 when the latter is shifted into its various predetermined positions controlling the arrow head.

For day signaling the current may be cut out by a switch 51 of any suitable type.

What we claim, is,—

1. In apparatus of the class described, the combination of a casing, means for securing the same at a side of an automobile, a rod pivotally connected to said casing, a frame connected to said rod, a pair of triangular plates pivotally connected to said frame and operatively connected to said plates, a bar movable longitudinally thereof in said casing, a lever fulcrumed to said bar, one end of said lever being pivotally connected to said rod, a spring carried by said bar and tending to maintain said lever in parallel relations with said bar, and means to impart longitudinal movements to said bar whereby said lever and rod influence said plates to afford direction indicative positions thereto.

2. In apparatus of the class described, a supporting element adapted to be secured at a side of an automobile, a frame pivotally connected to said element, a pair of substantially triangular plates pivoted intermediate their lengths to said frame at diametrically opposite sides of the pivotal connection of the frame to said supporting element, a bar movable longitudinally in said supporting element, operative connections between said bar and said plates, and means to impart axial movements to said bar whereby said plates are adjusted to cause said plates to act as an arrow-head and to selectively point the same toward the right, left or downwardly.

3. In apparatus of the class described, a supporting element adapted to be secured at a side of an automobile, and a signaling element comprising a pair of substantially triangular plates connected to said supporting element, reciprocatory means provided in said supporting element operatively connected to said plates, and means for actuating the aforesaid means to cause said plates to be oscillated selectively into right and left hand indicating directions, said second named means also serving to revolubly carry said plates into a stop indicating position.

4. In apparatus of the class described, a supporting element adapted to be secured at a side of an automobile, and a signaling element comprising a frame rotatably connected to said supporting element, a pair of substantially triangular plates pivotally supported in said frame and operatively connected with each other, and means for regulating the positions of said plates to afford an arrow-head to point toward the right or left hands selectively, said means also serving to rotate said frame to transpose the plates into stop indicative positions.

Signed at Bremerton, Washington, this 26th day of February, 1921.

WILLIAM S. HARRIS.
WILLIAM CRONAN.
FRANK I. JACKSON.

Witnesses:
RICHARD G. COOK,
H. E. WILSON.